United States Patent
Chen et al.

(10) Patent No.: US 7,280,879 B2
(45) Date of Patent: Oct. 9, 2007

(54) INTERFACES FROM EXTERNAL SYSTEMS TO TIME DEPENDENT PROCESS PARAMETERS IN INTEGRATED PROCESS AND PRODUCT ENGINEERING

(75) Inventors: Martin Chen, Los Gatos, CA (US); Shailesh P. Mane, San Jose, CA (US); Gaurav Sharma, San Jose, CA (US); Qi Wang, Cupertino, CA (US); Dallan Clancy, Belmont, CA (US); Mario Günter Rothenburg, Eppelheim (DE); Uwe Kohler, Dielheim (DE)

(73) Assignee: SAP AG, Walldorf (DE)

( * ) Notice: Subject to any disclaimer, the term of this patent is extended or adjusted under 35 U.S.C. 154(b) by 283 days.

(21) Appl. No.: 10/850,686

(22) Filed: May 20, 2004

(65) Prior Publication Data
US 2005/0261791 A1 Nov. 24, 2005

(51) Int. Cl.
*G06F 19/00* (2006.01)
*G06F 9/45* (2006.01)
*G06F 17/50* (2006.01)
*G05B 13/02* (2006.01)
*G06F 7/60* (2006.01)

(52) U.S. Cl. .................... 700/97; 700/42; 703/22; 703/16

(58) Field of Classification Search ............ 700/97, 700/42; 703/22, 16
See application file for complete search history.

(56) References Cited

U.S. PATENT DOCUMENTS 5,966,527 A * 10/1999 Krivokapic et al. .......... 703/14

| | | | |
|---|---|---|---|
| 2005/0021164 A1* | 1/2005 | Surholt et al. ............. | 700/106 |
| 2005/0138021 A1* | 6/2005 | Santoso et al. ............. | 707/3 |
| 2005/0138160 A1* | 6/2005 | Klein et al. ................ | 709/223 |
| 2005/0144150 A1* | 6/2005 | Ramamurthy et al. ....... | 706/45 |
| 2005/0159997 A1* | 7/2005 | John ......................... | 705/10 |
| 2005/0216372 A1* | 9/2005 | Hessedenz .................. | 705/28 |
| 2005/0261877 A1* | 11/2005 | Shelest et al. .............. | 702/186 |
| 2005/0261887 A1* | 11/2005 | Chen et al. ................. | 703/22 |
| 2005/0261888 A1* | 11/2005 | Chen et al. ................. | 703/22 |

OTHER PUBLICATIONS (1999). Supply Network Planning and Deployment. SAP AG. pp. 2.*
(2003). SAP Supply Chain Management (SAP SCM): Release Notes-Release 4.0. SAG AG. pp. 132-133.*

* cited by examiner

*Primary Examiner*—David Vincent
*Assistant Examiner*—Sunray Chang
(74) *Attorney, Agent, or Firm*—Kenyon & Kenyon LLP

(57) ABSTRACT

A method and apparatus for computer modeling the production process is disclosed. An integrated product and process engineering system may be a computer modeling system that models both a generic production process and a specific individual production process. The integrated product and process engineering system may store a time dependent process parameter related to the production process, having uploaded them via an interface. The time dependent process parameters may be retrieve and displayed to the user on a display using a remote function call enabled function module. The time dependent process parameters may be uploaded from an external system or revised using a remote function call enabled function module.

20 Claims, 7 Drawing Sheets

INTERFACES FROM EXTERNAL SYSTEMS TO TIME DEPENDENT PROCESS PARAMETERS IN INTEGRATED PROCESS AND PRODUCT ENGINEERING

CROSS REFERENCE TO RELATED APPLICATIONS

This application is related by common inventorship and subject matter to co-filed and co-pending applications titled "Time Dependent Process Parameters for Integrated Process and Product Engineering" and "Time Dependent Process Parameters and Engineering Change Number Conflict Report", filed May 20, 2004. Each of the aforementioned applications is incorporated herein by reference in its entirety.

TECHNICAL FIELD OF THE INVENTION

The present invention pertains to a computer modeling system for modeling a production process. More particularly, the present invention pertains to the input and output of time dependent process parameters into the computer modeling system.

BACKGROUND INFORMATION

Supply network planning (SNP) computer-modeling applications are used to plan out the production, or manufacturing, process for a product. SNP computer-modeling is typically only performed once a design for the product is finalized and all necessary specific component parts have been chosen. The planning horizon is usually from six to eighteen months, or even longer. The planning parameters used are usually not constant during the planning horizon. The changing values of planning parameters may adversely affect the quality and accuracy of the SNP runs over time.

An example of the changing values of these planning parameters is illustrated in the graph of FIG. 1. As shown in FIG. 1, when a new semiconductor product is introduced for production, the beginning yield rate is usually low. Then upon mastering the production process used, the yield rate may improve significantly over time. The targeting yield rates may change quarterly or even monthly. Therefore, using a fixed value representing the yield may adversely affect the ability of planners to properly forecast needed supplies or materials due to over-planning or under-planning.

SUMMARY OF THE INVENTION

A method and apparatus for computer modeling the production process is disclosed. An integrated product and process engineering system may be a computer modeling system that models both a generic production process and a specific individual production process. The integrated product and process engineering system may store a time dependent process parameter related to the production process, having uploaded them via an interface. The time dependent process parameters may be retrieved and displayed to the user on a display using a remote function call enabled function module. The time dependent process parameters may be uploaded from an external system or revised using a remote function call enabled function module.

BRIEF DESCRIPTION OF THE DRAWINGS

The invention is described in detail with reference to the following drawings wherein like numerals reference like elements, and wherein.

DETAILED DESCRIPTION OF THE PREFERRED EMBODIMENTS

An integrated product and process engineering (IPPE) system may be a computer modeling system that models both a generic production process and a specific individual production process. The IPPE system may store a time dependent process parameter (TDPP) related to the production process, having uploaded them via an interface. The TDPPs may be retrieved and displayed to the user on a display using a remote function call enabled function module. The TDPPs may be uploaded from an external system or revised using a remote function call enabled function module.

Figure 1:
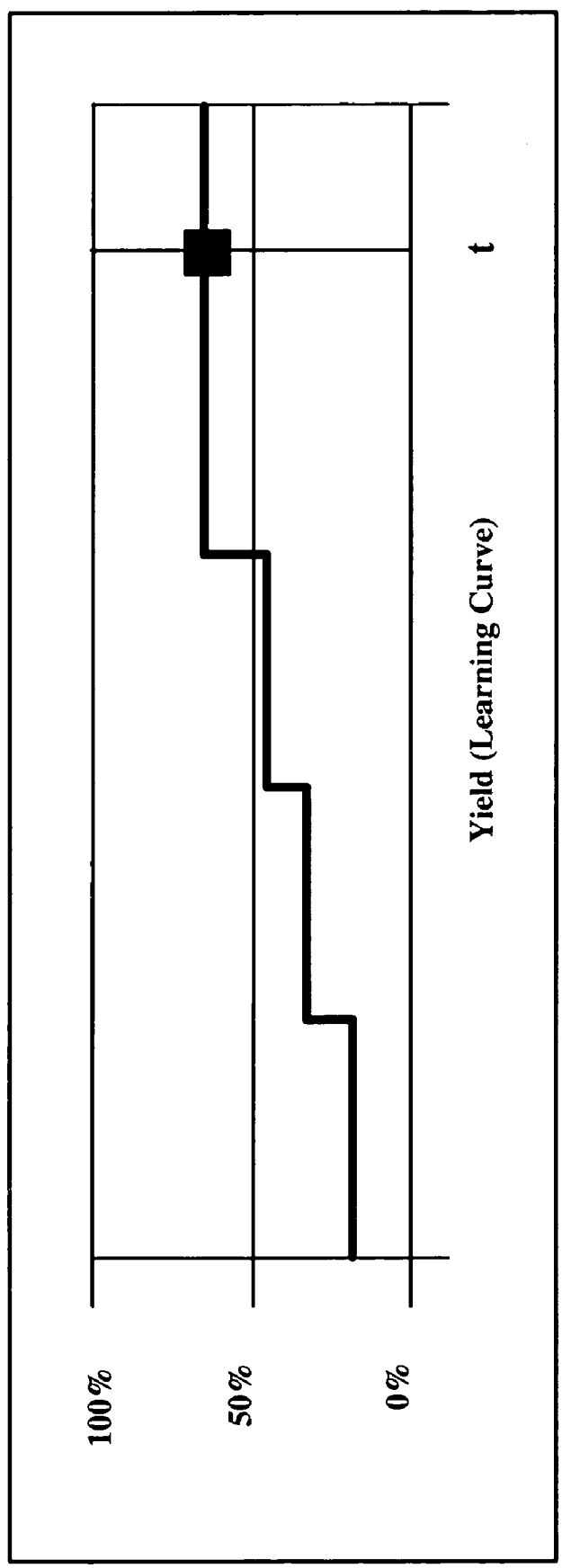
FIG. 1 illustrates the changing values of planning parameters in a graph form.
Figure 2:
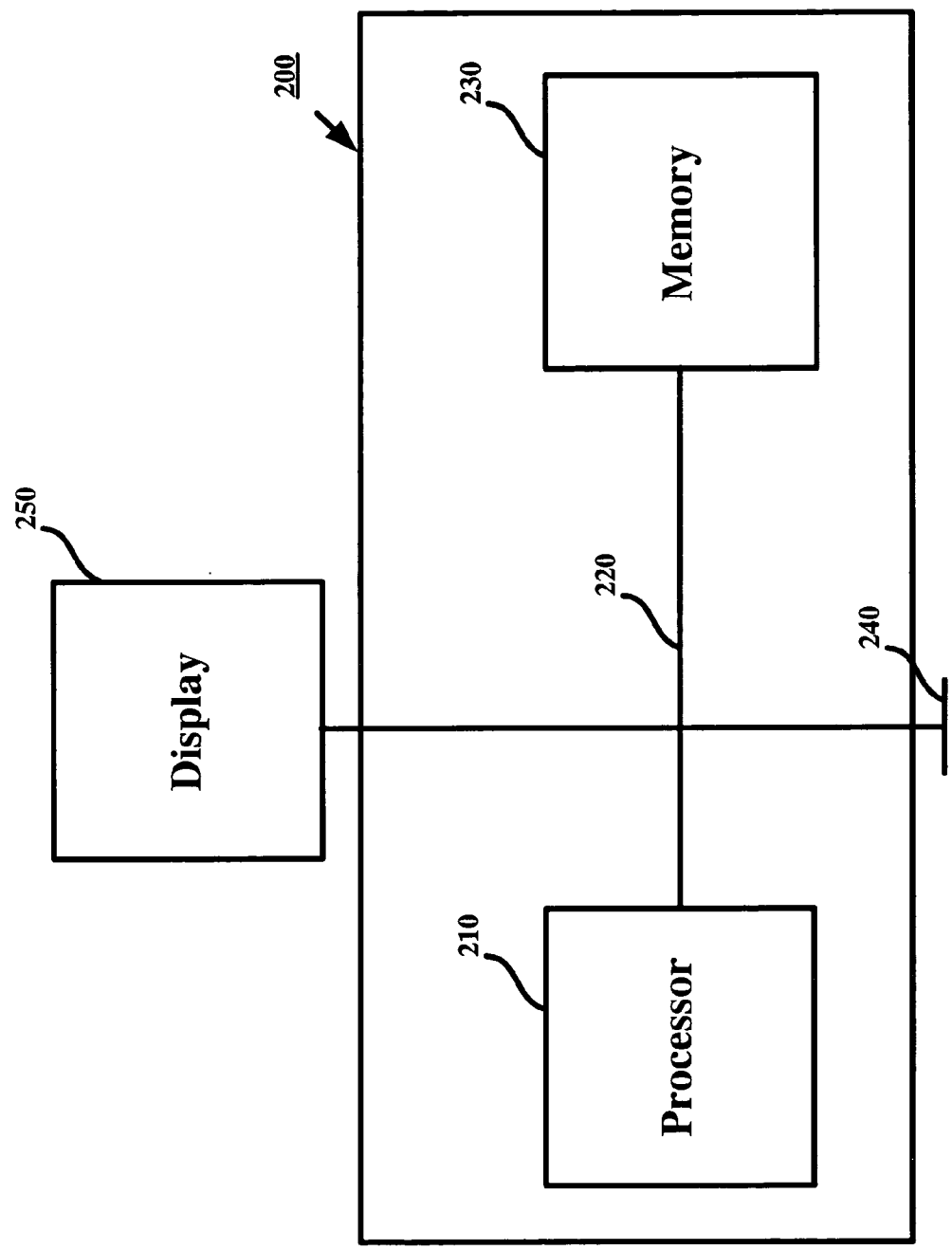
FIG. 2 illustrate in a block diagram one embodiment of a computer modeling system that may be used to implement the present invention.

FIG. 2 is a block diagram of one embodiment of a computer modeling system that may be used to implement the present invention. A computer modeling system 200 may include processor 210 connected by a bus 220 to a memory 230. The processor 210 can be any type of processor capable of executing software or other computer code, such as a microprocessor, digital signal processor, microcontroller, or the like. The computer modeling system 200 can be a personal computer (PC), mainframe, handheld device, portable computer, set-top box, or any other system that implements software or other computer code.

The memory 230 may be a hard disk, a floppy disk, random access memory (RAM), read only memory (ROM), flash memory, or any other type of machine medium readable by processor 210. The memory 230 may store instructions for performing the execution of the various method embodiments of the present invention such as methods shown in FIGS. 5-7. The processing system 200 may also have an interface 240 for the input and output of data and a display 250 to display the data.

The production process may be modeled on an IPPE system. Various nodes may be set up to represent raw materials needed to make finished goods, actions that must be performed during the production process, and tools and devices that may be used to perform those actions. The IPPE system may represent the relationships between those nodes, and used to calculate further nodes and parameters. Designing a production process for manufacturing a new product may be given greater flexibility by first creating a generic production process model before creating a specific production process model. The generic production process model may use abstracts of the different raw materials, actions, and tools without getting into specifics required by the design of the product. Once the specific design of the product is in place, a more specific production process model may be designed using the generic production process model. For example, a generic production process model for a manufacturing a computer may include generic representations of the hard drive, processor, and other parts, while the specific production process model may specify the type and brand of hard drive and processor needed to produce the specific computer design.

An IPPE engine is a software tool that allows for modeling both a generic production process and a specific individual production process. The IPPE may be run on any type of processing system, such as the computer modeling system 200 shown in FIG. 2. TDPPs may be used to represent those facets of the production process that have a value that may change over time, either due to improvements in the production process or for other reasons.

Figure 3:
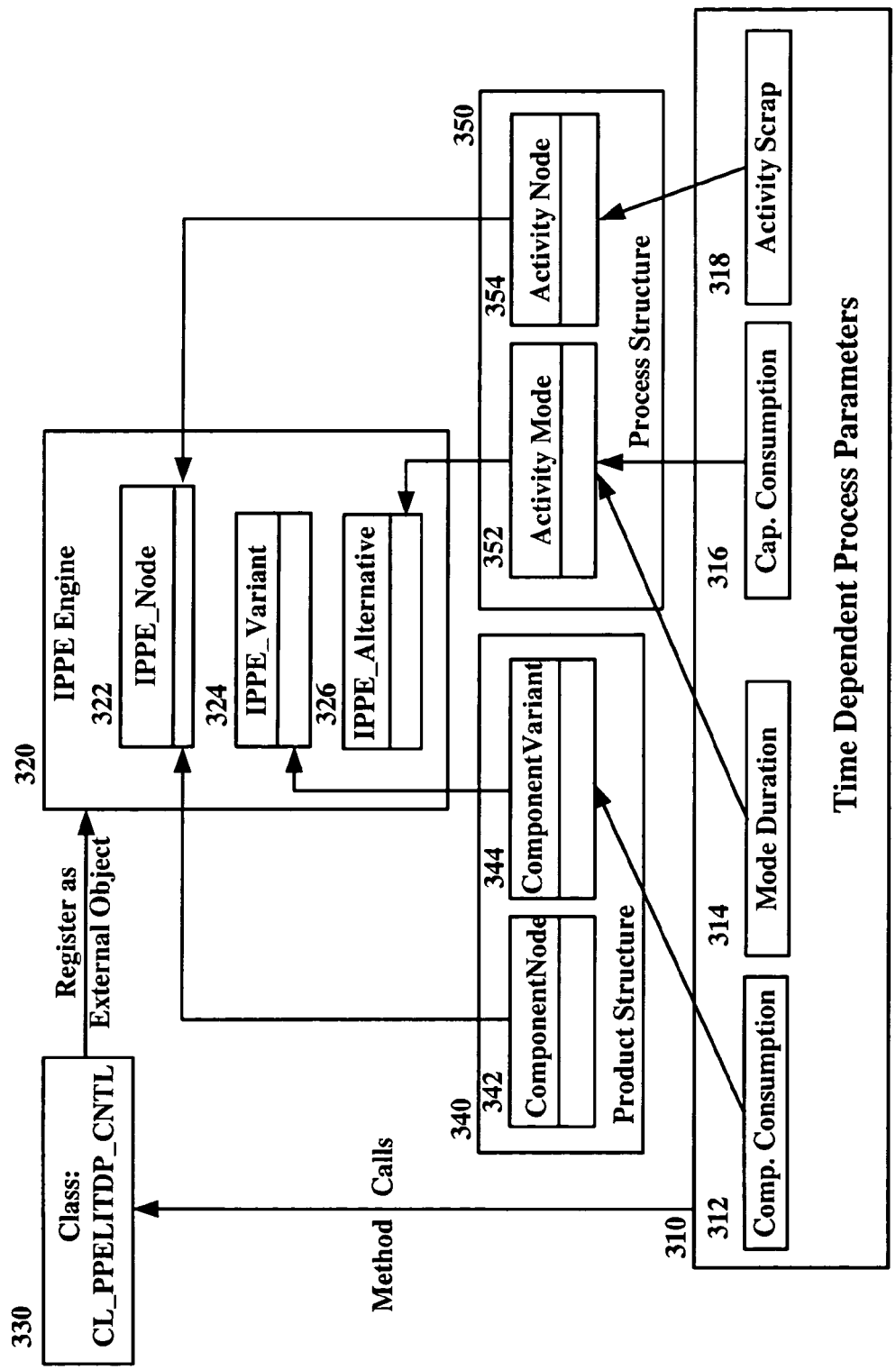
FIG. 3 illustrates in a block diagram one embodiment of the implementation of TDPP in an IPPE architecture according to the present invention.

FIG. 3 illustrates one embodiment of the implementation of TDPP in an IPPE architecture. The TDPPs 310 may be implemented as external objects to the IPPE engine 320 that performs the modeling of the production process. A new global class 330 may be created for the TDPPs 310 which will be registered with the IPPE as an external object. This global class 330 may contain the TDPP data. The TDPP data may include a parameter value and a date and time when the parameter value is in effect. This class 330 may also be used to implement existing interfaces that will allow the class to use method calls to save, copy, and delete TDPP data.

TDPPs may include input/output component consumption 312, activity duration 314, resource capacity consumption 316, and activity scrap 318. For example, input/output component consumption 312 may be the amount of raw materials needed to manufacture a finished product. Activity duration 314 may be the length of time needed to manufacture a finished product. Resource capacity consumption 316 may be tools and other items needed to manufacture a finished product. Activity scrap 318 may be the leftover waste produced during the manufacturing process. Other TDPPs may be added to the system as required to model the production process.

The IPPE engine 320 may interact with IPPE node data 322, IPPE variant data 324, and IPPE alternative data 326. An IPPE node is the subordinate term for all nodes that may exist in an IPPE environment. The IPPE nodes 322 represent general components and functions of the product, such as product structures 340, process structures 350, factory layouts, IPPE line designs, color schemes, or production resources. The product structures 340 may include component node data 342 and component variant data 344 and process structures 350 may include activity mode data 352 and activity node data 354. The IPPE nodes may be given different types to regulate their different aspects and attributes. For example, an IPPE node may be assigned a component node type 342 to represent product components or functions, a color node type to represent colors, an activity node type 354 to represent the process structure, a factory layout node type to represent factory layout functions, and resource node types to represent production resources. The node types may also be assigned a level, such as access level, view level, or structure level. This assignment may determine whether the node is the header of a structure, gives a view of a structure, or is part of a structure.

IPPE variant data 324 may be a concrete instance of an IPPE node. IPPE variants 324 may be created and edited at nodes of the product structure or at color nodes. Component variant data 344, a type of IPPE variant data 324, is a format for displaying the product structure for products that have many variants. The product variant structure is particularly suited to products that consist of a large number of individual materials and products that are made-to-order and configured-to-order.

IPPE alternative data 326 may represent alternative assemblies of a part that is to be produced. An IPPE alternative 326 groups together several relationships that point to subordinate nodes. IPPE alternatives 326 exist at structure nodes in the product structure or process structure. In the process structure, alternative nodes may define how and where an activity is executed. Activity mode data 352, a type of IPPE alternative data, may define how and where an activity is to be executed. The activity mode 352 may give a detailed description of how the activity is to take place. Several modes may be created for each activity.

The TDPPs 310 may be extensions of existing product structures 340 and process structures 350. Component consumption TDPP data 312 are extensions of component variant data 344. Mode duration TDPP data 314 and resource capacity consumption 316 are extensions of activity mode data 352. Activity scrap TDPP data 318 are extensions of activity node data 354.

Figure 4:
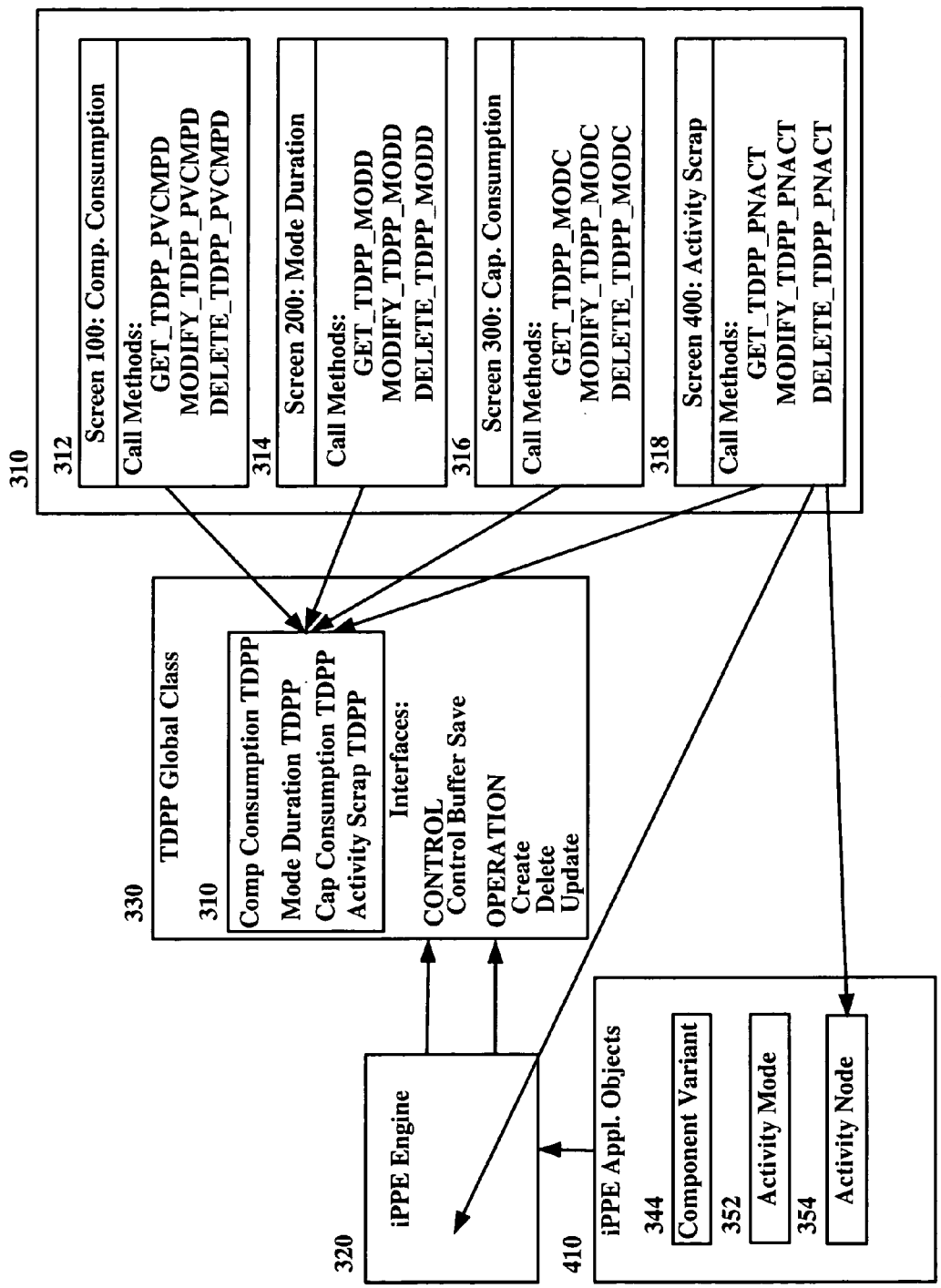
FIG. 4 illustrates in a block diagram one embodiment of the interactions with the IPPE engine according to the present invention.

FIG. 4 illustrates one embodiment of the interactions between the IPPE engine 320, the existing IPPE objects 410, the TDPP global class 330, and the TDPP function group 310. The IPPE engine 320 uses the TDPP global class 330 to create instances of the TDPP data, along with the TDPP function group 310, for whatever TDPP data type is needed. The TDPP global class 330 may include functions for creating, deleting, and modifying the stored TDPP data, in addition to other possible functions. The TDPP data appears to the IPPE engine 320 as a standard IPPE application object, such as component variant data 344 for TDPP component consumption data 312, activity mode data 354 for TDPP mode duration data 314 and TDPP capacity consumption data 316, and activity node data 354 for TDPP activity scrap data 318.

Figure 5:
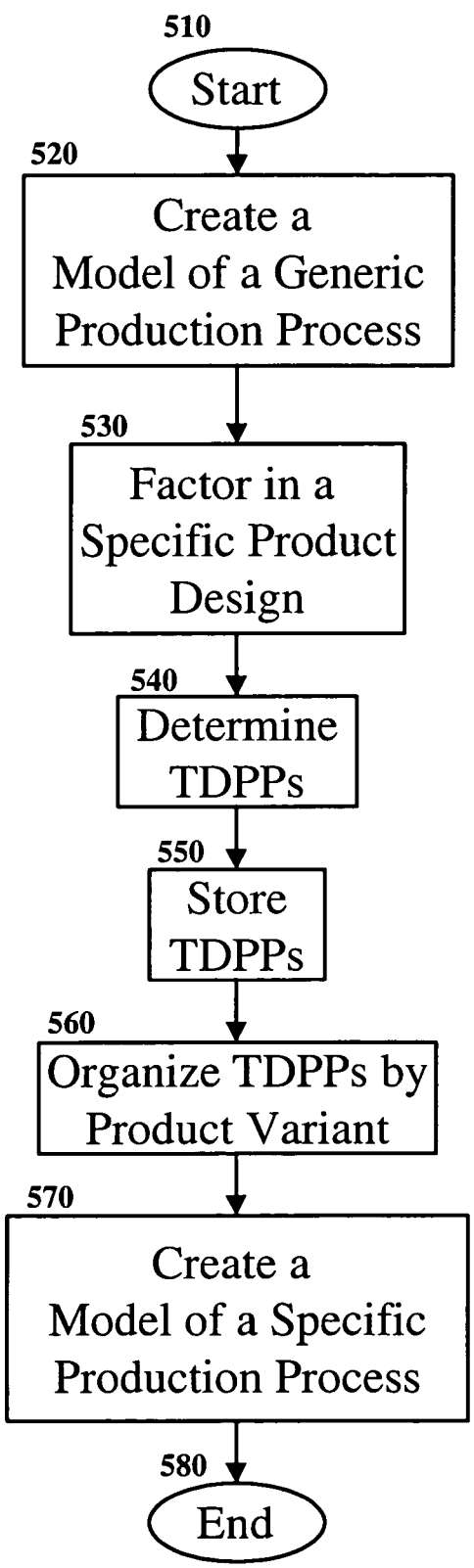
FIG. 5 illustrates in a flowchart one embodiment of the modeling performed by the IPPE engine according to an embodiment of the present invention.

FIG. 5 illustrates in a flowchart one embodiment of the modeling performed by the IPPE engine 320. The IPPE engine 320 starts (Block 510) by creating a generic model of a generic production process for producing a product (Block 520). The IPPE engine may then factor in a specific product design into the model (Block 530). The IPPE engine 320 may then determine the TDPPs resulting from that specific product design (Block 540). Alternatively, the TDPPs may be provided by some source external to the computer modeling system, calculated by the user and inputted into the system, or provided by some other method known in the art. The IPPE engine 320 may store the TDPPs related to the specific product design in the storage memory 230 (Block 550). In one embodiment, the IPPE engine 320 may organize the TDPPs by product variant (Block 560). A product variant may be a set of the products that include some minor alteration to the product that does not rise to the level of an improvement of the design of the product. For example, a product may come in a variety of colors that require different times to apply, so the activity duration TDPP for each colored product would be different. The IPPE engine 320 may then create a specific model of the specific individual production process for that specific product design using the TDPPs and the generic model, among other factors, (Block 570), ending this phase of the modeling process (Block 580).

Figure 6:
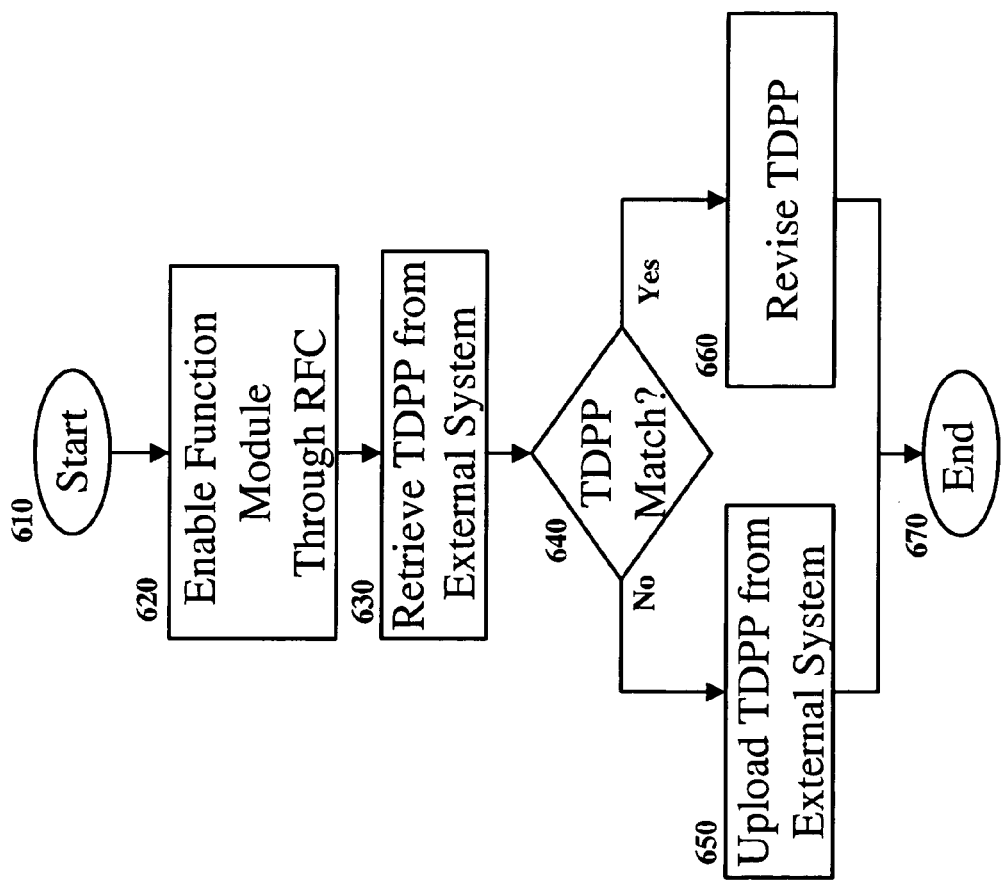
FIG. 6 illustrates in a flowchart one embodiment of a method of loading and revising TDPP data according to an embodiment of the present invention.

FIG. 6 illustrates in a flowchart one embodiment of a method of loading and revising TDPP data. The IPPE engine 320 starts (Block 610) by using a remote function call to enable a function module (Block 620) to retrieved TDPP data from an external system (Block 630). If the TDPP data does not match a product variant and start time all ready in the system (Block 640), the TDPP data is uploaded and added to the storage memory 230 with the rest of the TDPP data (Block 650), ending this phase of the process (Block 660). If the TDPPs match a product variant and start time all ready in the system (Block 640), the stored TDPPs are revised to match the external data (Block 670), ending this phase of the process (Block 660). In alternate embodiments, different function modules may perform each of these actions or one function module may perform all these actions.

Figure 7:
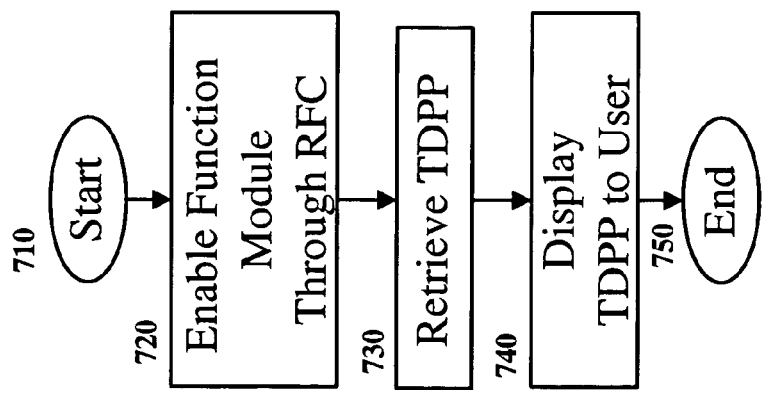
FIG. 7 illustrates in a flowchart one embodiment of a method of retrieving TDPP data according to an embodiment of the present invention.

FIG. 7 illustrates in a flowchart one embodiment of a method of retrieving TDPP data. The IPPE engine 320 starts (Block 710) by using a remote function call to enable a function module (Block 720) to retrieve TDPP data stored in the processing system 200 (Block 730). The function module may then display the TDPPs to the user (Block 740), ending this phase of the process (Block 750). In alternate embodiments, different function modules may perform each of these actions or one function module may perform all these actions.

Figure 8:
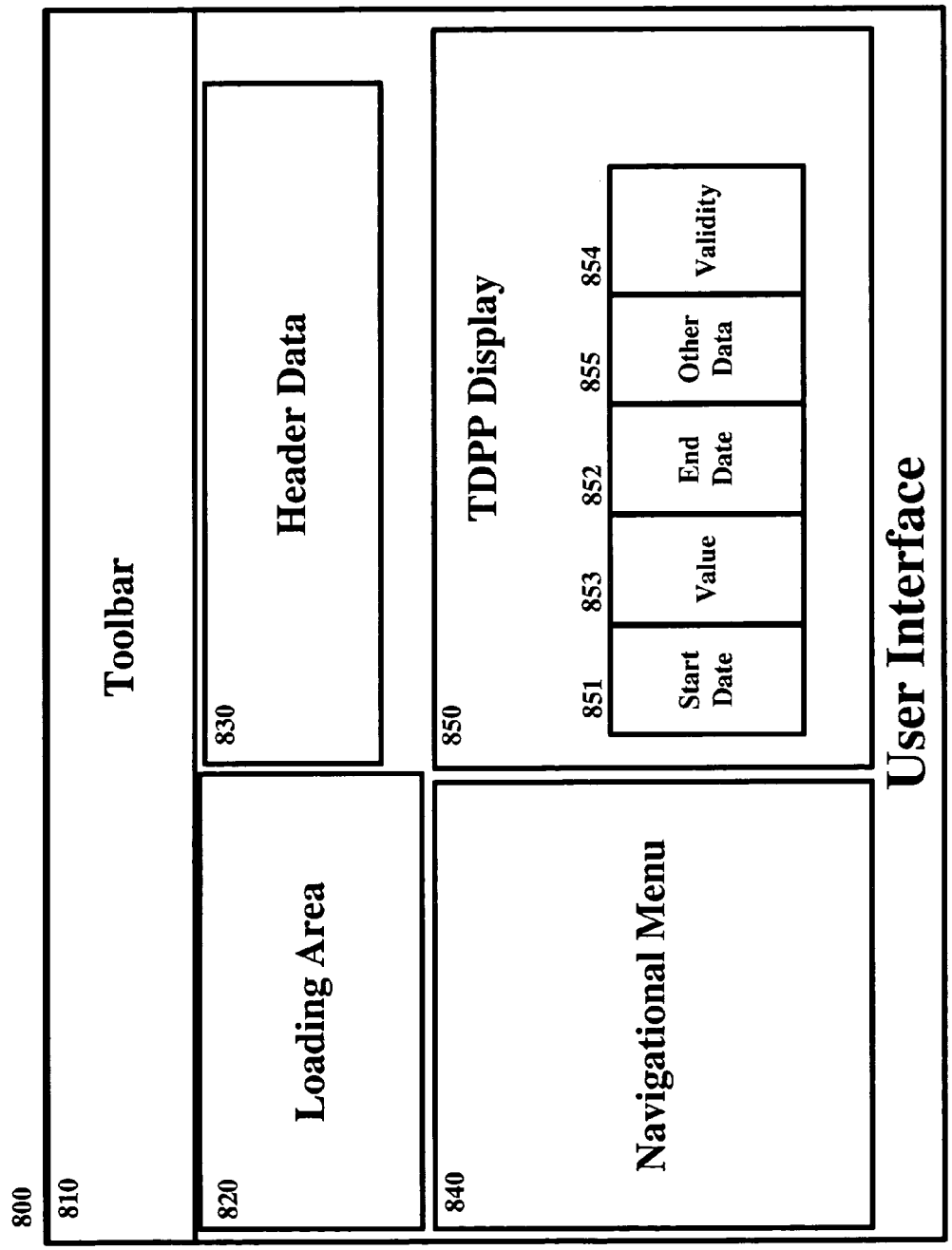
FIG. 8 illustrates in a block diagram one embodiment of a user interface as presented to a user according to an embodiment of the present invention.

FIG. 8 illustrates in a block diagram one embodiment of a user interface 800 as presented to a user on the display 250. The user interface 800 may have a toolbar 810 for standard software functions such as save, delete, edit, and others. The user interface may also have a loading area 820 to load any IPPE objects, such as a process structure or product structure. A user may enter into the loading area 820 certain selection criteria of the object to be loaded, such as the name of the IPPE object. Header data 830 for the TDPP data may be provided. A navigational menu 840 may allow a user to select a product variant. The TDPP display 850 will then show TDPP data keyed to that product variant. The TDPP display 851 may show a start time 851 and an end time 852 for each TDPP, indicating the time period when that TDPP is in effect. In many cases, including an end time 852 will be impractical. In those instances the effective time period for the TDPP may be bound by the start time 851 for that TDPP and the start time 851 for a subsequent TDPP. The TDPP display 250 may also show a parameter value 853, a validity flag 854 to signal whether the TDPP is valid, and any other data 855.

While the invention has been described with reference to the above embodiments, it is to be understood that these embodiments are purely exemplary in nature. Thus, the invention is not restricted to the particular forms shown in the foregoing embodiments. Various modifications and alterations can be made thereto without departing from the spirit and scope of the invention.

The invention claimed is:

1. A method, comprising:
    creating a generic model of a generic production process for a generic product design of a product using an integrated product and process engineering system;
    retrieving a time dependent process parameter related to a specific product design of the product from an external source;
    comparing the time dependent process parameter with time dependent process parameters stored in the integrated product and process engineering system;
    if the time dependent process parameter does not match the stored time dependent process parameters, uploading the time dependent process parameter related to the specific product design of the product into the integrated product and process engineering system; and
    creating a specific individual model of a specific individual production process for the specific product design of the product using the integrated product and process engineering system, wherein:
    the specific individual model includes the time dependent process parameter; and
    the specific individual model is based on the generic model.

2. The method of claim 1, further comprising:
    retrieving the time dependent process parameter from the integrated product and process engineering system; and
    displaying the time dependent process parameter to a user.

3. The method of claim 2, further comprising using a remote function call to enable a function module to retrieve and display the time dependent process parameter.

4. The method of claim 1, further comprising revising the time dependent process parameter.

5. The method of claim 4, further comprising using a remote function call to enable a function module to revise the time dependent process parameter.

6. The method of claim 1, wherein the time dependent process parameter is uploaded from an external system.

7. The method of claim 6, further comprising using a remote function call to enable a function module to upload the time dependent process parameter.

8. A set of instructions residing in a storage medium, said set of instructions capable of being executed by a storage controller to implement a method for processing data, the method comprising:
    creating a generic model of a generic production process for a generic product design of a product using an integrated product and process engineering system;
    retrieving a time dependent process parameter related to a specific product design of the product from an external source;
    comparing the time dependent process parameter with time dependent process parameters stored in the integrated product and process engineering system;
    if the time dependent process parameter does not match the stored time dependent process parameters, uploading the time dependent process parameter related to a specific product design of the product into the integrated product and process engineering system; and
    creating a specific individual model of a specific individual production process for a specific product design of the product using the integrated product and process engineering system, wherein:
    the specific individual model includes the time dependent process parameter; and
    the specific individual model is based on the generic model.

9. The set of instructions of claim 8, wherein the time dependent process parameter is stored as an instance of a global class with functions to create, delete, or modify the time dependent process parameter.

10. The set of instructions of claim 9, further comprising:
    retrieving the time dependent process parameter from the integrated product and process engineering system; and
    displaying the time dependent process parameter to a user.

11. The set of instructions of claim 10, further comprising using a remote function call to enable a function module to retrieve and display the time dependent process parameter.

12. The set of instructions of claim 9, further comprising revising the time dependent process parameter.

13. The set of instructions of claim 12, further comprising using a remote function call to enable a function module to revise the time dependent process parameter.

14. The set of instructions of claim 9, further comprising using a remote function call to enable a function module to upload the time dependent process parameter.

15. An integrated product and process engineering system, comprising:
   an interface that retrieves a time dependent process parameter related to a specific product design of a product from an external system;
   a processor that runs a program creating a generic model of a generic production process for a generic product design of a product and a specific individual model of a specific individual production process for the specific product design based on the generic model and compares the retrieved time dependent process parameter to stored time dependent process parameters; and
   a memory that stores the stored time dependent process parameters and the specific individual model including the time dependent process parameter,
   wherein if the retrieved time dependent process parameter does not match the stored time dependent process parameters, the interface uploads the retrieved time dependent process parameter related to the specific product design of the product.

16. The integrated product and process engineering system of claim 15, further comprising a display that shows the time dependent process parameter retrieved from the memory to a user.

17. The integrated product and process engineering system of claim 16, wherein the processor executes a remote function call to enable a function module to retrieve and display the time dependent process parameter.

18. The integrated product and process engineering system of claim 15, wherein the processor revises the time dependent process parameter stored in the memory.

19. The integrated product and process engineering system of claim 18, wherein the processor executes a remote function call to enable a function module to revise the time dependent process parameter.

20. The integrated product and process engineering system of claim 15, wherein the time dependent process parameter is uploaded from an external system.

* * * * *